US010471969B1

(12) United States Patent
Laserra Lima

(10) Patent No.: US 10,471,969 B1
(45) Date of Patent: Nov. 12, 2019

(54) SYSTEM AND METHOD TO RESTRICT VEHICLE OPERATIONS IN RESPONSE TO DRIVER IMPAIRMENT

(71) Applicant: GM GLOBAL TECHNOLOGY OPERATIONS LLC, Detroit, MI (US)

(72) Inventor: Thiago Laserra Lima, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/240,945

(22) Filed: Jan. 7, 2019

(51) Int. Cl.
| | |
|---|---|
| *B60W 20/12* | (2016.01) |
| *B60W 50/12* | (2012.01) |
| *B60W 50/14* | (2012.01) |
| *G05D 1/00* | (2006.01) |
| *B60W 40/08* | (2012.01) |
| *G06K 9/00* | (2006.01) |

(52) U.S. Cl.
CPC ............ *B60W 50/12* (2013.01); *B60W 40/08* (2013.01); *B60W 50/14* (2013.01); *G05D 1/0061* (2013.01); *G06K 9/00845* (2013.01); *B60W 2040/0836* (2013.01); *B60W 2040/0845* (2013.01); *B60W 2050/146* (2013.01); *G05D 2201/0213* (2013.01)

(58) Field of Classification Search
CPC ...... B60W 50/12; B60W 40/08; B60W 50/14; B60W 2040/0836; B60W 2040/0845; B60W 2050/146; G05D 1/0061; G05D 2201/0213

USPC ........................................................ 340/576
See application file for complete search history.

(56) References Cited

U.S. PATENT DOCUMENTS

| | | | |
|---|---|---|---|
| 8,760,300 B2 | 6/2014 | Sezanayev | |
| 9,019,107 B2 | 4/2015 | Biondo et al. | |
| 9,925,872 B1* | 3/2018 | Alasry | B60W 50/12 |
| 9,975,552 B2 | 5/2018 | Biondo et al. | |
| 2012/0228047 A1 | 9/2012 | White et al. | |
| 2014/0156133 A1* | 6/2014 | Cullinane | B60W 30/00 701/23 |
| 2017/0021837 A1* | 1/2017 | Ebina | B60K 28/06 |
| 2017/0090475 A1* | 3/2017 | Choi | A61B 5/0059 |
| 2017/0225567 A1* | 8/2017 | Tsuda | B60K 35/00 |
| 2017/0234689 A1* | 8/2017 | Gibson | G01C 21/3492 701/25 |
| 2017/0261981 A1* | 9/2017 | Ichikawa | G05D 1/0061 |
| 2018/0046185 A1* | 2/2018 | Sato | B62D 1/286 |
| 2018/0174486 A1 | 6/2018 | Huntzicker et al. | |

(Continued)

*Primary Examiner* — Ojiako K Nwugo

(57) ABSTRACT

One general aspect includes a method to restrict vehicle operations in response to a detection of vehicle occupant impairment, the method including: detecting a vehicle occupant is in an impaired state; in response to detecting the vehicle occupant is in the impaired state: when a vehicle is in an autonomous driving mode, restricting the vehicle occupant from being able to shift the vehicle to a manual driving mode; and when the vehicle is in the manual driving mode, providing a notification configured to warn the vehicle occupant of risks associated with operating the vehicle while in the impaired state, or the notification being configured to recommend that the vehicle occupant shifts the vehicle to the autonomous driving mode, or the notification being configured to alert the vehicle occupant that the vehicle will automatically be shifted to the autonomous driving mode, or some combination thereof.

20 Claims, 4 Drawing Sheets

(56) References Cited

U.S. PATENT DOCUMENTS

| | | | |
|---|---|---|---|
| 2018/0237027 A1* | 8/2018 | Lundsgaard | B60W 50/0098 |
| 2018/0326992 A1* | 11/2018 | Aoi | B60W 50/08 |
| 2019/0025825 A1* | 1/2019 | Takahama | B60W 50/14 |
| 2019/0041850 A1* | 2/2019 | Chase | B60W 50/029 |
| 2019/0047588 A1* | 2/2019 | Yabuuchi | B60W 50/14 |
| 2019/0049954 A1* | 2/2019 | Mitchell | G05D 1/0297 |
| 2019/0049955 A1* | 2/2019 | Yabuuchi | G05D 1/0061 |
| 2019/0056731 A1* | 2/2019 | Westbrook | G05D 1/0061 |
| 2019/0064805 A1* | 2/2019 | Frazzoli | G05D 1/0061 |
| 2019/0071044 A1* | 3/2019 | Nezaki | B60R 21/01554 |
| 2019/0077419 A1* | 3/2019 | Samma | B60N 2/90 |
| 2019/0092341 A1* | 3/2019 | Stark | B60W 50/10 |
| 2019/0184981 A1* | 6/2019 | Jung | B60W 30/06 |
| 2019/0225236 A1* | 7/2019 | Hashimoto | B60W 50/08 |
| 2019/0241099 A1* | 8/2019 | Sugiyama | B60N 2/64 |
| 2019/0241196 A1* | 8/2019 | Yamamoto | B60W 50/14 |

\* cited by examiner

SYSTEM AND METHOD TO RESTRICT VEHICLE OPERATIONS IN RESPONSE TO DRIVER IMPAIRMENT

INTRODUCTION

Operating a vehicle while under the influence of drugs and/or alcohol is extremely dangerous not only to the vehicle occupant(s) but anyone in the vicinity of the vehicle. Autonomous vehicles alleviate this problem by controlling themselves and not allowing an inebriated occupant to take control of the vehicle. However, certain autonomous vehicles still allow for manual operations and thus such vehicles provide a way for this individual to operate the vehicle and jeopardize themselves as well as everyone around them. It is therefore desirable to restrict vehicle occupants from shifting their autonomous vehicle to a manual driving mode while they are intoxicated. It is further desirable to automatically transfer the autonomous vehicle out of its manual driving mode when its occupant(s) are detected as being impaired. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to restrict vehicle operations in response to a detection of vehicle occupant impairment, the method including: detecting a vehicle occupant is in an impaired state; in response to detecting the vehicle occupant is in the impaired state: when a vehicle is in an autonomous driving mode, restricting the vehicle occupant from being able to shift the vehicle to a manual driving mode; and when the vehicle is in the manual driving mode, providing a notification configured to warn the vehicle occupant of risks associated with operating the vehicle while in the impaired state, or the notification being configured to recommend that the vehicle occupant shifts the vehicle to the autonomous driving mode, or the notification being configured to alert the vehicle occupant that the vehicle will automatically be shifted to the autonomous driving mode, or some combination thereof. Other embodiments of this aspect include corresponding computer systems, apparatus, and computer programs recorded on one or more computer storage devices, each configured to perform the actions of the methods.

Implementations may include one or more of the following features. The method further including: when the vehicle is in the autonomous driving mode, providing an autonomous driving mode restriction override to the vehicle occupant; and in response to a consent of the restriction override by the vehicle occupant, removing the restriction to the vehicle occupant from being able to shift the vehicle to the manual driving mode. The method further including: when the vehicle is in the manual driving mode, shifting the vehicle to the autonomous driving mode and restricting the vehicle occupant from being able to shift the vehicle back to the manual driving mode. The method where the step of detecting the vehicle occupant is in the impaired state includes: detecting an impairment level of the vehicle occupant; and determining that the impairment level exceeds an impairment threshold. The method where the step of detecting the vehicle occupant is in the impaired state is carried out by an impairment sensor. The method where the impairment sensor is configured to scan air present within an interior of the vehicle to detect a presence of a substance that indicates the vehicle occupant is impaired. The method where the substance is alcohol. Implementations of the described techniques may include hardware, a method or process, or computer software on a computer-accessible medium.

One general aspect includes a system to restrict vehicle operations in response to a detection of vehicle occupant impairment, the system including: a memory configured to include one or more executable instructions and a processor configured to execute the executable instructions, where the executable instructions enable the processor to: detect a vehicle occupant is in an impaired state; in response to detecting the vehicle occupant is in the impaired state: when a vehicle is in an autonomous driving mode, restrict the vehicle occupant from being able to shift the vehicle to a manual driving mode; and when the vehicle is in the manual driving mode, provide a notification configured to warn the vehicle occupant of risks associated with operating the vehicle while in the impaired state, or the notification being configured to recommend that the vehicle occupant shifts the vehicle to the autonomous driving mode, or the notification being configured to alert the vehicle occupant that the vehicle will automatically be shifted to the autonomous driving mode, or some combination thereof. Other embodiments of this aspect include corresponding computer systems, apparatus, and computer programs recorded on one or more computer storage devices, each configured to perform the actions of the methods.

Implementations may include one or more of the following features. The system where the executable instructions further enable the processor to: when the vehicle is in the autonomous driving mode, provide an autonomous driving mode restriction override to the vehicle occupant; and in response to a consent of the restriction override by the vehicle occupant, remove the restriction to the vehicle occupant from being able to shift the vehicle to the manual driving mode. The system where the executable instructions further enable the processor to: when the vehicle is in the manual driving mode, shift the vehicle to the autonomous driving mode and restrict the vehicle occupant from being able to shift the vehicle back to the manual driving mode. The system where the step to detect the vehicle occupant is in the impaired state includes: detect an impairment level of the vehicle occupant; and determine that the impairment level exceeds an impairment threshold. The system where the step to detect the vehicle occupant is in the impaired state is carried out by an impairment sensor. The system where the impairment sensor is configured to scan air present within an interior of the vehicle to detect a presence of a substance that indicates the vehicle occupant is impaired. The system where the substance is alcohol. Implementations of the described techniques may include hardware, a method or process, or computer software on a computer-accessible medium.

One general aspect includes a vehicle configured to shift between a manual driving mode and an autonomous driving mode, the vehicle including: an impairment sensor; and a memory configured to include one or more executable instructions and a processor configured to execute the executable instructions, where the executable instructions enable the processor to: detect, via the impairment sensor, a vehicle occupant is in an impaired state; in response to detecting the vehicle occupant is in the impaired state: when in the autonomous driving mode, restrict the vehicle occupant from being able to shift to the manual driving mode; and when in the manual driving mode, provide a notification configured to warn the vehicle occupant of risks associated with operating the vehicle while in the impaired state, or the notification being configured to recommend that the vehicle occupant shifts to the autonomous driving mode, or the notification being configured to alert the vehicle occupant that the vehicle will automatically shift to the autonomous driving mode, or some combination thereof. Other embodiments of this aspect include corresponding computer systems, apparatus, and computer programs recorded on one or more computer storage devices, each configured to perform the actions of the methods.

Implementations may include one or more of the following features. The vehicle where the executable instructions further enable the processor to: when in the autonomous driving mode, provide an autonomous driving mode restriction override to the vehicle occupant; and in response to a consent of the restriction override by the vehicle occupant, remove the restriction to the vehicle occupant from being able to shift to the manual driving mode. The vehicle where the executable instructions further enable the processor to: when in the manual driving mode, shift to the autonomous driving mode and restrict the vehicle occupant from being able to shift back to the manual driving mode. The vehicle where the step to detect the vehicle occupant is in the impaired state includes: detect, via the impairment sensor, an impairment level of the vehicle occupant; and determine that the impairment level exceeds an impairment threshold. The vehicle where the impairment sensor is configured to scan air present within an interior of the vehicle to detect a presence of a substance that indicates the vehicle occupant is impaired. The vehicle where the substance is alcohol. Implementations of the described techniques may include hardware, a method or process, or computer software on a computer-accessible medium.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following detailed description is merely exemplary in nature and is not intended to limit the application and uses. Furthermore, there is no intention to be bound by any expressed or implied theory presented in the preceding background and brief summary or the following detailed description. As used herein, the term module refers to an application specific integrated circuit (ASIC), an electronic circuit, a processor (shared, dedicated, or group) and memory that executes one or more software or firmware programs or code segments, a combinational logic circuit, and/or other suitable components that provide the described functionality.

Figure 1:
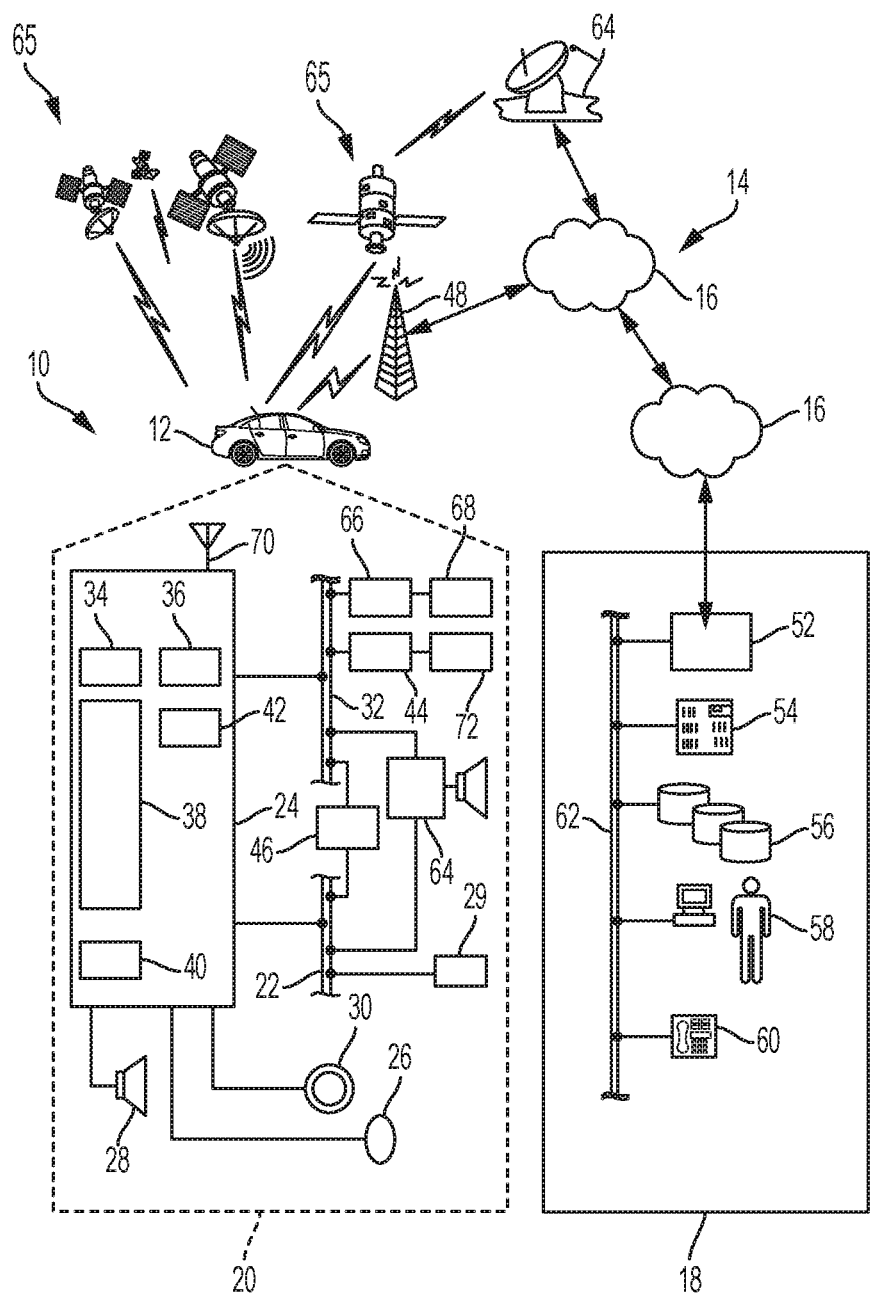
FIG. 1 is a block diagram depicting an exemplary embodiment of a communications system capable of utilizing the system and method disclosed herein.

As shown in FIG. 1, there is shown a non-limiting example of a communication system 10 that may be used together with examples of the apparatus/system disclosed herein or to implement examples of the methods disclosed herein. Communication system 10 generally includes a vehicle 12, a wireless carrier system 14, a land network 16 and a call center 18. It should be appreciated that the overall architecture, setup, and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 is capable of shifting between two distinct driving modes: a manual driving mode and an autonomous driving mode. The manual driving mode enable a vehicle operator to control vehicle driving operations while the vehicle traverses from one location to another. In order to do so, as is generally known, the vehicle occupant will manually interact with a steering system (discussed below), braking system (discussed below), transmission (discussed below), propulsion system (discussed below), amongst other systems. The autonomous driving mode is carried out by the systems discussed below and is otherwise considered as a self-driving vehicle mode. Autonomous driving mode enables the vehicle 12 to traverse from one location to another without any vehicle occupant interaction(s).

Vehicle 12 be any type of double driving mode capable vehicle such as a motorcycle, car, truck, bicycle, recreational vehicle (RV), boat, plane, scooter, etc., and is equipped with suitable hardware and software that enables it to communicate over communication system 10. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the fundamental vehicle hardware 20 is shown generally in FIG. 1 including a telematics unit 24, a microphone 26, a speaker 28, an impairment sensor 29, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is a communication system which provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42 capable of communicating location information via a GPS satellite system. GPS component 42 thus receives coordinate signals from a constellation 65 of GPS satellites. From these signals, GPS component 42 can determine vehicle position, which may be used for providing navigation and other position-related services to the vehicle operator. Navigation information can be presented on a display of telematics unit 24 (or other display within the vehicle) or can be presented verbally such as is done when supplying turn-by-turn navigation. The navigation services can be provided using a dedicated in-vehicle navigation module (which can be part of GPS chipset/component 42), or some or all navigation services can be done via telematics unit 24, wherein the location coordinate information is sent to a remote location for purposes of providing the vehicle with navigation maps, map annotations, route calculations, and the like. It should be understood that the telematics unit display is preferably a graphics display, such as a touch screen on the instrument panel, and can be used to provide a multitude of input and output functions (i.e., capable of GUI implementation).

The telematics unit 24 may provide various services including: turn-by-turn directions and other navigation-related services provided in conjunction with the GPS component 42; airbag deployment notification and other emergency or roadside assistance-related services provided in connection with various crash and/or collision sensor interface modules 66 and collision sensors 68 located throughout the vehicle; and/or comfort related assistance to adjust the vehicle seat and mirror positions that are provided in connection with various sensor interface modules 66; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services telematics unit 24 may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc. The cellular component 34 and wireless modem 36 can moreover collaborate to provide wireless health information to ensure their proper functionality for voice communications and data transmissions. To accomplish this effect, dual mode antenna 70 services the GPS component 42 and the cellular component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The impairment sensor 29 is configured to detect an impairment level of a vehicle occupant (e.g., the vehicle operator) and provide impairment information to the electronic processing device 38. The impairment sensor 29 may include one or more of a breathalyzer, an infrared sensor, a near infrared tissue spectrometry sensor, a distance spectrometry sensor, an electrochemical sensor, an eye scanner, a laser sensor, a camera, a microphone, a motion detector, a driving performance sensor, an ocular movement sensor, and a behavioral sensor, etc. The impairment information may be received directly from the impairment sensor 29, may be read from electronic memory 40, or received via cellular chipset/component 34. In particular, the behavioral sensor may detect impaired behavior based on one or more from among a vehicle occupant's movements (e.g., upon entering vehicle 12), a gaze of a vehicle occupant, a speech of a vehicle occupant (e.g., via Microphone 26), etc. Moreover, in an exemplary embodiment, the impairment sensor 29 may be configured to scan fluids, such as one or more from among urine, saliva, and/or blood, and/or scan hair, skin and/or breath to detect the presence, amount, and/or concentration of substances that indicates a subject (i.e., vehicle occupant) is impaired. In another exemplary embodiment, the impairment sensor 27 may be configured to scan air present within the interior of the vehicle's cabin that contains the vehicle occupant's exhalation so as to detect the presence, amount, and/or concentration of substances that indicates a subject is impaired. The substance may include alcohol, a predetermined drug such as a prescription drug or illegal drug. For example, the impairment sensor 29 may scan for one or more from among alcohol, opiates, cocaine, THC, marijuana, and methamphetamines, etc., and/or chemical compositions and bi-products associated with the aforementioned substances.

According to yet another exemplary embodiment, a laser sensor may transmit a laser to ping the dermis and excite molecules of the impairing substance. The laser may then be used to measure the amount of the impairing substance present in capillary blood. The impairment sensor 29 may provide information on the aforementioned substances to be included in the impairment information. For example, the impairment information may include one or more from among blood alcohol content (BAC), amount or concentration of a predetermined drug, amount or concentration of an impairing or intoxicating substance, and an impaired status of a vehicle operator.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to telematics unit 24 via the crash and/or collision detection sensor interface 66 regarding the severity of a vehicle collision, such as the angle of impact and the amount of force sustained.

Vehicle sensors 72, connected to various vehicle sensor modules 44 (VSMs) in the form of electronic hardware components located throughout vehicle 12 and use the sensed input to perform diagnostic, monitoring, control, reporting and/or other functions. Each of the VSMs 44 is preferably connected by vehicle bus 32 to the other VSMs, as well as to the telematics unit 24, and can be programmed to run vehicle system and subsystem diagnostic tests. As examples, one VSM 44 can be an engine control module (ECM) that controls various aspects of engine operation such as fuel ignition and ignition timing and another VSM 44 can be a powertrain control module (PCM) that regulates operation of one or more components of the powertrain system. According to one embodiment, the ECM is equipped with on-board diagnostic (OBD) features that provide myriad real-time vehicle health data, such as that received from various sensors including vehicle emissions sensors and vehicle oil sensors as well as provide a standardized series of diagnostic trouble codes (DTCs) which allow a technician to rapidly identify and remedy malfunctions within the vehicle. ECM can also be equipped with fuel tank diagnostics features that provide myriad real-time vehicle fuel data, such as fuel level information. Another VSM 44 can be a body control module (BCM) that governs various electrical components located throughout the vehicle and provide myriad real-time vehicle body data with respect to the vehicle's power door locks, tire pressure, lighting system, engine ignition, vehicle seat adjustment and heating, mirrors, and headlights. Another VSM 44 can be a vehicle immobilization module (VIM) that can provide immobilization health data and prevent the engine from being provided powered and thus immobilize vehicle 12.

Wireless carrier system 14 may be a cellular telephone system or any other suitable wireless system that transmits signals between the vehicle hardware 20 and land network 16. According to an example, wireless carrier system 14 includes one or more cell towers 48.

Land network 16 can be a conventional land-based telecommunications network connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system backend functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56.

Server 54 can incorporate a data controller which essentially controls the operations of server 54. Server 54 may control data information as well as act as a transceiver to send and/or receive the data information (i.e., data transmissions) from one or more of the databases 56, and telematics unit 24. The controller is moreover capable of reading executable instructions stored in a non-transitory machine readable medium and may include one or more from among a processor, microprocessor, central processing unit (CPU), graphics processor, Application Specific Integrated Circuits (ASICs), Field-Programmable Gate Arrays (FPGAs), state machines, and a combination of hardware, software, and firmware components.

Figure 2:
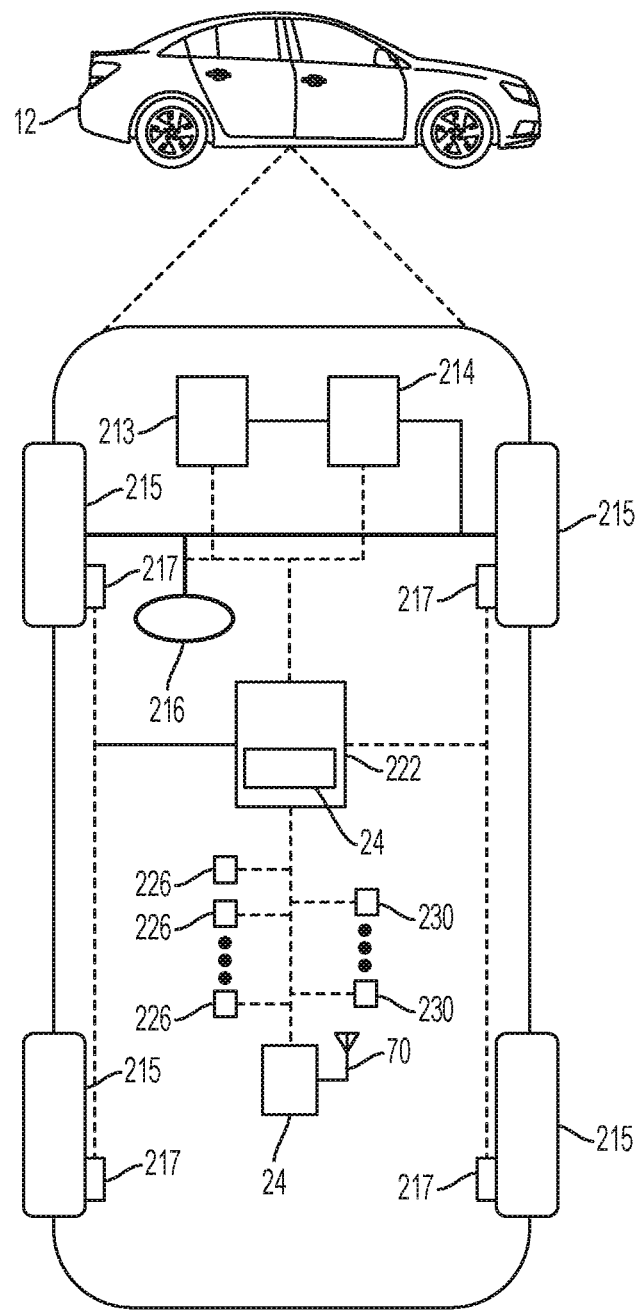
FIG. 2 is a schematic diagram of an autonomously controlled vehicle, according to an embodiment of the communications system of FIG. 1.

As shown in FIG. 2, communication system 10 may incorporate one or more embodiments of vehicle 12 being able to activate an autonomous driving mode. With such embodiments, in addition to the systems discussed above, vehicle 12 further includes a transmission 214 configured to transmit power from the propulsion system 213 to a plurality of vehicle wheels 215 according to selectable speed ratios. According to various embodiments, the transmission 214 may include a step-ratio automatic transmission, a continuously-variable transmission, or other appropriate transmission. The vehicle 12 additionally includes wheel brakes 217 configured to provide braking torque to the vehicle wheels 215. The wheel brakes 217 may, in various embodiments, include friction brakes, a regenerative braking system such as an electric machine, and/or other appropriate braking systems. The vehicle 12 additionally includes a steering system 216. It should be understood that each of these systems may also be operated manually, for example, when vehicle 12 is in a manual operation mode or when the autonomous mode is being override for emergency purposes.

Telematics unit 24 is moreover configured to wirelessly communicate with other vehicles ("V2V") and/or infrastructure ("V2I") and/or pedestrians ("V2P"). These communications may collectively be referred to as a vehicle-to-entity communication ("V2X"). In an exemplary embodiment, in addition to the communication channels listed above, this communication system is further configured to communicate via at least one dedicated short-range communications (DSRC) channel. DSRC channels refer to one-way or two-way short-range to medium-range wireless communication channels specifically designed for automotive use and a corresponding set of protocols and standards.

When vehicle 12 is in the autonomous driving mode, the propulsion system 213, transmission 214, steering system 216, and wheel brakes 217 will be in communication with or under the control of at least one controller 222. While depicted as a single unit for illustrative purposes, the controller 222 may additionally include one or more other controllers, collectively referred to as a "controller." The controller 222 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 222 in controlling the vehicle.

Controller 222 includes an automated driving system (ADS) 224 for automatically controlling various actuators in the vehicle while in the autonomous driving mode. In an exemplary embodiment, ADS 224 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 224 is configured to communicate automated driving information with and control propulsion system 213, transmission 214, steering system 216, and wheel brakes 217 to control vehicle acceleration, steering, and braking, respectively, without human intervention via a plurality of actuators 230 in response to inputs from a plurality of driving sensors 226, which may include GPS, RADAR, LIDAR, optical cameras, thermal cameras, ultrasonic sensors, and/or additional sensors as appropriate.

Figure 3:
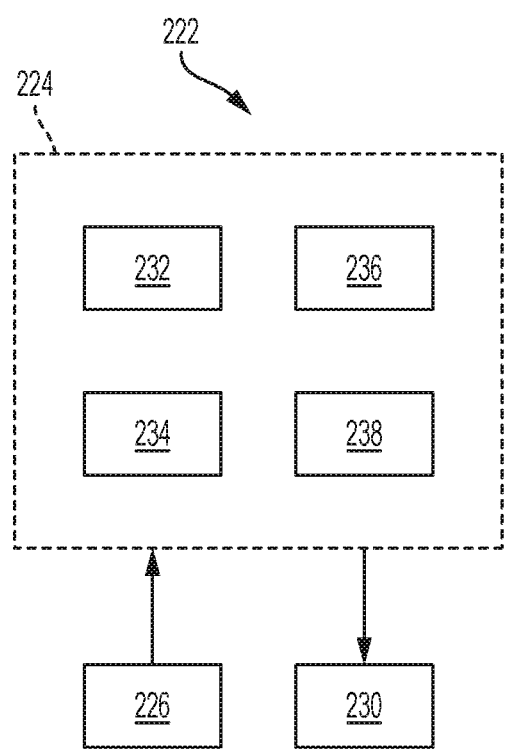
FIG. 3 is a schematic block diagram of an exemplary automated driving system (ADS) for the vehicle of FIG. 2.

In various embodiments, the instructions of the ADS 224 may be organized by function or system. For example, as shown in FIG. 3, ADS 224 can include a sensor fusion system 232 (computer vision system), a positioning system 234, a guidance system 236, and a vehicle control system 238. As can be appreciated, in various embodiments, the instructions may be organized into any number of systems (e.g., combined, further partitioned, etc.) as the disclosure is not limited to the present examples.

In various embodiments, the sensor fusion system 232 synthesizes and processes sensor data and predicts the presence, location, classification, and/or path of objects and features of the environment of the vehicle 12. In various embodiments, the sensor fusion system 232 can incorporate information from multiple sensors, including but not limited to cameras, LIDARS, radars, and/or any number of other types of sensors. In one or more exemplary embodiments described herein, the sensor fusion system 232 supports or otherwise performs the ground reference determination processes and correlates image data to LIDAR point cloud data, the vehicle reference frame, or some other reference coordinate frame using calibrated conversion parameter values associated with the pairing of the respective camera and reference frame to relate LIDAR points to pixel locations, assign depths to the image data, identify objects in one or more of the image data and the LIDAR data, or otherwise synthesize associated image data and LIDAR data. In other words, the sensor output from the sensor fusion system 232 provided to the vehicle control system 238 (e.g., indicia of detected objects and/or their locations relative to the vehicle 12) reflects or is otherwise influenced by the calibrations and associations between camera images, LIDAR point cloud data, and the like.

The positioning system 234 processes sensor data along with other data to determine a position (e.g., a local position relative to a map, an exact position relative to lane of a road, vehicle heading, velocity, etc.) of the vehicle 12 relative to the environment. The guidance system 236 processes sensor data along with other data to determine a path for the vehicle 12 to follow (i.e., path planning data). The vehicle control system 238 generates control signals for controlling the vehicle 12 according to the determined path.

In various embodiments, the controller 222 implements machine learning techniques to assist the functionality of the controller 222, such as feature detection/classification, obstruction mitigation, route traversal, mapping, sensor integration, ground-truth determination, and the like.

The output of controller 222 is communicated to actuators 230 when the autonomous driving mode is activated. In an exemplary embodiment, the actuators 230 include a steering control, a shifter control, a throttle control, and a brake control. The steering control may, for example, while in the autonomous driving mode, control a steering system 216 as illustrated in FIG. 2. The shifter control may, for example, while in the autonomous driving mode, control a transmission 214 as illustrated in FIG. 2. The throttle control may, for example, while in the autonomous driving mode, control a propulsion system 213 as illustrated in FIG. 2. The brake control may, for example, while in the autonomous driving mode, control wheel brakes 217 as illustrated in FIG. 2.

Figure 4:
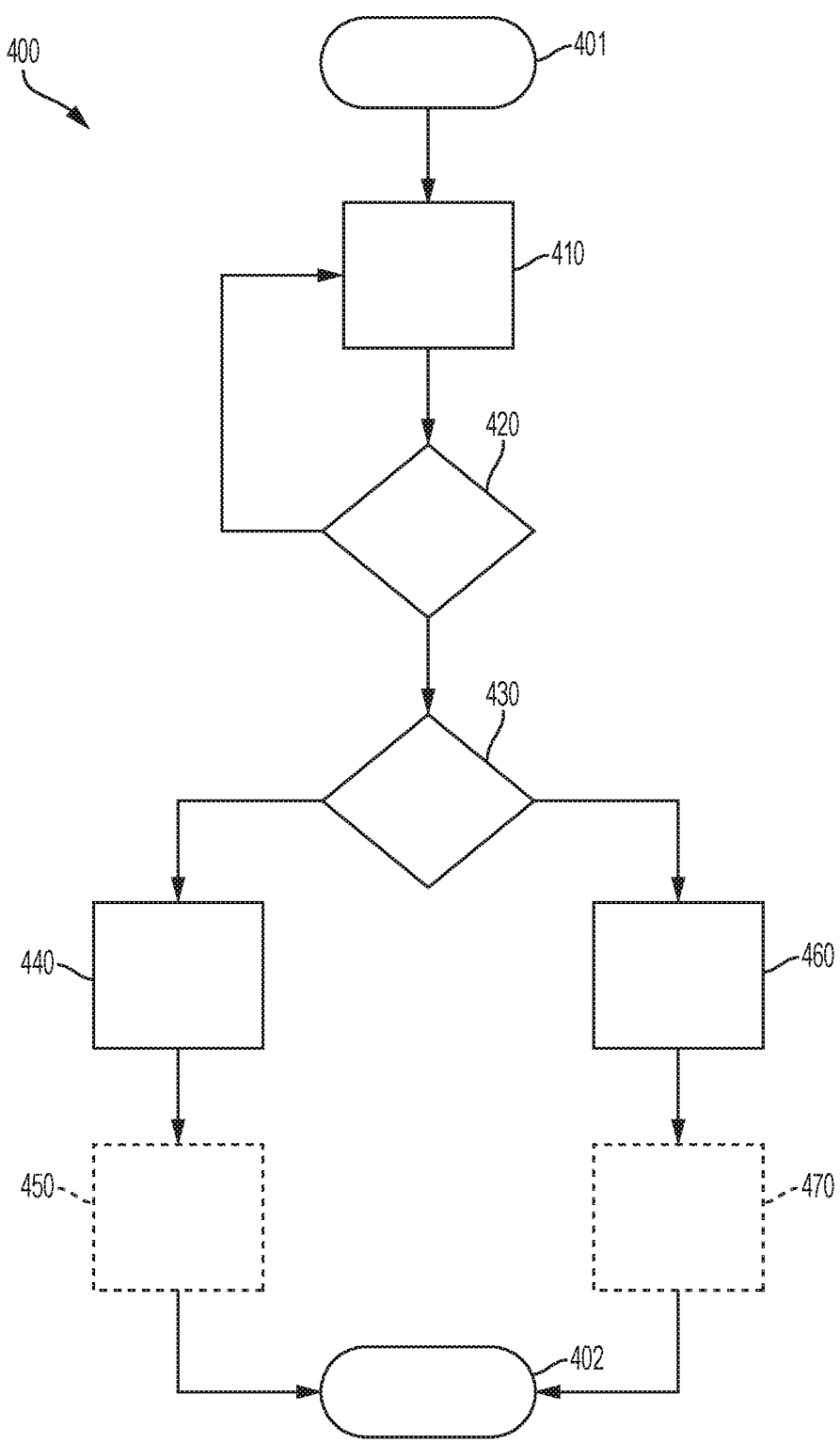
FIG. 4 is an exemplary flow chart for utilization of system and method aspects disclosed herein.

FIG. 4 shows a flowchart for a method 400 for restricting vehicle operations in response to the detection of vehicle occupant impairment according to an exemplary embodiment. The method 400 may be performed by impairment sensor 29 or may be encoded into a computer readable medium as instructions (e.g., electronic memory 40) that are executable by a computer (e.g., electronic processing device 38) to perform the method 400. Referring to FIG. 4, method 400 begins at 401, when a vehicle occupant enters into the cabin of vehicle 12. In step 410, an impairment level of the vehicle occupant is detected, which may occur while the vehicle occupant enters into the vehicle cabin or soon thereafter (e.g., within the first five (5) seconds of entering the cabin or at some point before they attempt to take control of the vehicle operations). It should be understood the impairment level may be detected by one or more of the impairment detection techniques discussed above with regard to the impairment sensor 29 (e.g., the behavioral sensor techniques, occupant fluid scanning techniques, air/exhalation scanning techniques, laser analysis techniques, etc.).

In step 420, it is determined whether the detected impairment level is greater than a first impairment threshold in operation. The first impairment threshold may, for example, be a legal limit required by the jurisdiction in which the vehicle 12 located at the beginning of a trip (or at some other point during the trip). With regard to BAC, in many jurisdictions, the legal limit (i.e., the maximum allowable BAC amount) is 0.08 BAC. In other words, anything higher than a 0.08 BAC is considered legally intoxicated and thus the vehicle occupant would be determined to be legally impaired. Moreover, in this step, if the impairment level is less than the first impairment threshold (e.g., 0.08 BAC), method 400 will return to step 410 and continue to detect an impairment level of the vehicle occupant (i.e., the impairment level of the vehicle occupant will continue to be monitored). However, if the impairment level is greater than or equal to the first impairment threshold (e.g., 0.08 BAC), method 400 will move to step 430.

It should be understood that, in this step, the detected impairment level may be compared to one or more subsequent impairment thresholds and one or more additional impairment levels may also be detected for the purposes of accuracy. For example, if the impairment level (e.g., via the air/exhalation scanning technique) is greater than or equal to the first impairment threshold, it could be determined whether the impairment level is greater than a second impairment threshold. Moreover, in this example, if the impairment level is greater than or equal to the second impairment threshold, method 400 would move to step 430. Otherwise, if the impairment level is less than the second impairment threshold, a second impairment level could be detected in operation (e.g., via laser analysis techniques) and this second impairment level could be compared to the first and/or second impairment thresholds. This comparison process step could continue until a proper level of accuracy has been reached.

In step 430, it is determined whether vehicle 12 is in manual driving mode (e.g., traditional human operation of vehicle 12) or if the vehicle 12 is in autonomous driving mode (as discussed above). If vehicle 12 is in manual driving mode, method 400 will move to step 440; otherwise, vehicle 12 is in autonomous driving mode and will move to step 460.

In step 440, vehicle 12 will provide a notification to the user on the display of telematics unit 24 or the driver information center (DIC) display. The notification may also be adapted to warn the vehicle occupant (e.g., the vehicle operator) about risks associated with driving while in an impaired state and may also/alternatively recommend to the vehicle occupant (e.g., vehicle operator) to activate the autonomous driving mode so as to avoid driving under the influence. The notification may also be accompanied by and audible warning via audio system 64 (e.g., a chime) or tactile warning via one or more piezoelectric devices (not shown) known to be embedded in the vehicle seat of the vehicle occupant. Moreover, an exemplary notification may state via one or more GUIs "WARNING: DRIVING UNDER THE INFLUENCE IS ILLEGAL AND MAY RESULT IN PRISON TIME" or the like. Or an exemplary notification may state (via one or more GUIs) "THE VEHICLE'S SENSORS INDICATE DRIVING UNDER THE INFLUENCE IS LIKELY IT IS RECOMMENDED THAT THE VEHICLE BE SHIFTED TO THE AUTONOMOUS DRIVING MODE" or the like.

In optional step 450, vehicle 12 will automatically shift from the manual driving mode to the autonomous driving mode. Moreover, vehicle 12 will restrict the vehicle occupant from being able to shift the vehicle back to the manual driving mode (i.e., vehicle 12 will completely deactivate manual driving mode). Restricting the vehicle occupant's driving abilities in this manner will ensure they cannot drive while legally impaired and thus improve road safety. Skilled artisans will see that when the vehicle 12 is restricted to the autonomous driving mode, the notification (step 440) may state something to the effect of the vehicle 12 being restricted to this mode. For example, an exemplary notification may state (via one or more GUIs) "WARNING: DUE TO THE VEHICLE OPERATOR BEING LEGALLY IMPAIRED, VEHICLE OPERATIONS ARE RESTRICTED TO THE AUTONOMOUS DRIVING MODE" or the like. After optional step 450, method 400 will move to completion 402.

In step 460, since already in an autonomous vehicle mode, vehicle 12 will automatically restrict the vehicle occupant from being able to activate the manual driving mode. As stated above, restricting the vehicle occupant's driving abilities in this manner will ensure they cannot drive while legally impaired and thus improve road safety. In optional step 470, vehicle 12 will provide an autonomous driving mode restriction override to the vehicle occupant. For example, vehicle 12 will provide a virtual prompt (via one or more GUIs) on the display of telematics unit 24 which requests an input that represents the vehicle occupant's consent to deactivate the autonomous driving mode and shift vehicle operations back to the manual driving mode. As such, the vehicle 12 may request the vehicle occupant to press a virtual button (via one or more GUIs) on the display that represents they have consented to the risks of driving while impaired (and thus taking liability for their own actions). This override may also provide a notification that lists the dangers of driving while impaired so as to ensure vehicle occupant can better understand the risks associated with impaired driving and what they are specifically consenting to when manually operating vehicle 12. As follows, if the vehicle occupant consents to drive the car while impaired via the override, in response, vehicle 12 will remove the restriction to the manual driving mode activation. After optional step 470, method 400 will move to completion 402.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to restrict manual vehicle operations in response to a detection of vehicle occupant intoxication due to the vehicle occupant being under the influence of drugs or alcohol or both drugs and alcohol such that the vehicle occupant is not legally permitted to operate the vehicle in a manual driving mode, the method comprising:
   detecting a vehicle occupant is in an intoxicated state;
   in response to detecting the vehicle occupant is in the intoxicated state:
      when a vehicle is in an autonomous driving mode, restricting the vehicle occupant from being able to shift the vehicle to a manual driving mode; and
      when the vehicle is in the manual driving mode, providing a notification configured to warn the vehicle occupant of risks associated with operating the vehicle while in the intoxicated state and the notification being configured to recommend that the vehicle occupant shifts the vehicle to the autonomous driving mode.

2. The method of claim 1, further comprising:
   when the vehicle is in the autonomous driving mode, providing an autonomous driving mode restriction override to the vehicle occupant, wherein the autonomous driving mode restriction override is provided via one or more virtual prompts on a display, wherein the autonomous driving mode restriction override requests an input from the vehicle occupant that represents a consent to deactivate the autonomous driving mode by the vehicle occupant; and
   in response to a consent of the restriction override by the vehicle occupant, removing the restriction to the vehicle occupant from being able to shift the vehicle to the manual driving mode.

3. The method of claim 1, further comprising:
   when the vehicle is in the manual driving mode, shifting the vehicle to the autonomous driving mode and restricting the vehicle occupant from being able to shift the vehicle back to the manual driving mode.

4. The method of claim 1, wherein the step of detecting the vehicle occupant is in the impaired state includes:
   detecting an intoxication level of the vehicle occupant; and
   determining that the intoxication level exceeds an intoxication threshold.

5. The method of claim 1, wherein the step of detecting the vehicle occupant is in the intoxicated state is carried out by an impairment sensor.

6. The method of claim 5, wherein the impairment sensor is configured to scan air present within an interior of the vehicle to detect a presence of a substance that indicates the vehicle occupant is intoxicated.

7. The method of claim 6, wherein the substance is alcohol.

8. A system to restrict manual vehicle operations in response to a detection of vehicle occupant intoxication due to the vehicle occupant being under the influence of drugs or alcohol or both drugs and alcohol such that the vehicle occupant is not legally permitted to operate the vehicle in a manual driving mode, the system comprising:
   a memory configured to comprise one or more executable instructions and a processor configured to execute the executable instructions, wherein the executable instructions enable the processor to:
      detect a vehicle occupant is in an intoxicated state;
      in response to detecting the vehicle occupant is in the intoxicated state:
         when a vehicle is in an autonomous driving mode, restrict the vehicle occupant from being able to shift the vehicle to a manual driving mode; and
         when the vehicle is in the manual driving mode, provide a notification configured to warn the vehicle occupant of risks associated with operating the vehicle while in the intoxicated state and the notification being configured to recommend that the vehicle occupant shifts the vehicle to the autonomous driving mode.

9. The system of claim 8, wherein the executable instructions further enable the processor to:
   when the vehicle is in the autonomous driving mode, provide an autonomous driving mode restriction override to the vehicle occupant, wherein the autonomous driving mode restriction override is provided via one or more virtual prompts on a display, wherein the autonomous driving mode restriction override requests an input from the vehicle occupant that represents a consent to deactivate the autonomous driving mode by the vehicle occupant; and
   in response to a consent of the restriction override by the vehicle occupant, remove the restriction to the vehicle occupant from being able to shift the vehicle to the manual driving mode.

10. The system of claim 8, wherein the executable instructions further enable the processor to:
    when the vehicle is in the manual driving mode, shift the vehicle to the autonomous driving mode and restrict the vehicle occupant from being able to shift the vehicle back to the manual driving mode.

11. The system of claim 8, wherein the step to detect the vehicle occupant is in the impaired state includes:
    detect an intoxication level of the vehicle occupant; and
    determine that the intoxication level exceeds an intoxication threshold.

12. The system of claim 8, wherein the step to detect the vehicle occupant is in the intoxicated state is carried out by an impairment sensor.

13. The system of claim 12, wherein the impairment sensor is configured to scan air present within an interior of the vehicle to detect a presence of a substance that indicates the vehicle occupant is intoxicated.

14. The system of claim 13, wherein the substance is alcohol.

15. A vehicle configured to shift between a manual driving mode and an autonomous driving mode, the vehicle comprising:
- an impairment sensor configured to detect when a vehicle occupant is intoxicated due to the vehicle occupant being under the influence of drugs or alcohol or both drugs and alcohol such that the vehicle occupant is not legally permitted to operate the vehicle in a manual driving mode; and
- a memory configured to comprise one or more executable instructions and a processor configured to execute the executable instructions, wherein the executable instructions enable the processor to:
  - detect, via the impairment sensor, a vehicle occupant is in an intoxicated state;
  - in response to detecting the vehicle occupant is in the intoxicated state:
    - when in the autonomous driving mode, restrict the vehicle occupant from being able to shift to the manual driving mode; and
    - when in the manual driving mode, provide a notification configured to warn the vehicle occupant of risks associated with operating the vehicle while in the intoxicated state and the notification being configured to recommend that the vehicle occupant shifts the vehicle to the autonomous driving mode.

16. The vehicle of claim 15, wherein the executable instructions further enable the processor to:
- when in the autonomous driving mode, provide an autonomous driving mode restriction override to the vehicle occupant, wherein the autonomous driving mode restriction override is provided via one or more virtual prompts on a display, wherein the autonomous driving mode restriction override requests an input from the vehicle occupant that represents a consent to deactivate the autonomous driving mode by the vehicle occupant; and
- in response to a consent of the restriction override by the vehicle occupant, remove the restriction to the vehicle occupant from being able to shift to the manual driving mode.

17. The vehicle of claim 15, wherein the executable instructions further enable the processor to:
- when in the manual driving mode, shift to the autonomous driving mode and restrict the vehicle occupant from being able to shift back to the manual driving mode.

18. The vehicle of claim 15, wherein the step to detect the vehicle occupant is in the impaired state includes:
- detect, via the impairment sensor, an intoxication level of the vehicle occupant; and
- determine that the intoxication level exceeds an intoxication threshold.

19. The vehicle of claim 15, wherein the impairment sensor is configured to scan air present within an interior of the vehicle to detect a presence of a substance that indicates the vehicle occupant is intoxicated.

20. The vehicle of claim 15, wherein the substance is alcohol.

* * * * *